(12) United States Patent
Calippe et al.

(10) Patent No.: US 9,225,792 B2
(45) Date of Patent: Dec. 29, 2015

(54) SYSTEM AND METHOD FOR CACHING MOBILE SERVICES DATABASE OBJECTS

(75) Inventors: Joël R. Calippe, San Jose, CA (US); Claudio A. Ortega, Redwood City, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 108 days.

(21) Appl. No.: 13/180,572

(22) Filed: Jul. 12, 2011

(65) Prior Publication Data

US 2013/0018842 A1 Jan. 17, 2013

(51) Int. Cl.
*G06F 7/00* (2006.01)
*H04L 29/08* (2006.01)
*G06F 17/30* (2006.01)

(52) U.S. Cl.
CPC .......... *H04L 67/28* (2013.01); *G06F 17/30902* (2013.01)

(58) Field of Classification Search
CPC ................... G06F 17/30902; G06F 17/30575; G06F 17/3048; G06F 11/2082
USPC ........................... 707/622, 625; 711/726, 118
See application file for complete search history.

(56) References Cited

U.S. PATENT DOCUMENTS

| | | | |
|---|---|---|---|
| 5,893,920 A * | 4/1999 | Shaheen et al. | 711/133 |
| 6,072,784 A * | 6/2000 | Agrawal et al. | 370/311 |
| 6,901,437 B1 * | 5/2005 | Li | 709/219 |
| 7,395,258 B2 * | 7/2008 | Altinel et al. | 1/1 |
| 7,945,577 B2 * | 5/2011 | Altinel et al. | 707/769 |
| 2004/0224675 A1 * | 11/2004 | Puskoor et al. | 455/419 |
| 2004/0267843 A1 * | 12/2004 | Dinh et al. | 708/204 |
| 2006/0069715 A1 * | 3/2006 | Vayssiere | 709/203 |
| 2012/0179653 A1 * | 7/2012 | Araki et al. | 707/634 |
| 2012/0265898 A1 * | 10/2012 | Kruglick | 709/235 |

FOREIGN PATENT DOCUMENTS

WO WO 2004057437 * 7/2004

OTHER PUBLICATIONS

Ieong et al., On Adaptive Caching in Mobile Databases, Acm, 1997, pp. 302-309.*
Frangiadakis et al., The 18th Annual IEEE International Symposium on Peronal, Indoor and Mobile Radio Communications, (PIMRC '07), 5 pages.*
Qureshi, K., CSREA EEE, 7 pages, 2006.*
Lee et al, Incremental View Maintenance for Mobile Databases, Knowledge and Information Systems (2000) 2: 413-437.*
Lau et al., Object Caching and Prefetching in Distributed Virtual Walkthrough, Real-Time Systems, 21, 143-164, 2001.*

* cited by examiner

*Primary Examiner* — Cheyne D Ly
(74) *Attorney, Agent, or Firm* — Wall & Tong, LLC (57) ABSTRACT

A method and system for updating a mobile services database by caching some or all of relevant portions thereof, identifying and optionally prioritize those data objects that need updating, and periodically update only those data objects in response to a triggering event.

19 Claims, 4 Drawing Sheets

SYSTEM AND METHOD FOR CACHING MOBILE SERVICES DATABASE OBJECTS

FIELD OF THE INVENTION

The invention relates generally to managing network resources such as in a wireless network and, more specifically but not exclusively, adapting an update function associated with a mobile services database.

BACKGROUND

Every time there is an update to one or more services or objects in a mobile network such as an Long Term Evolution (LTE) network, a mobile services table is updated to reflect the update. In particular, a relatively time consuming process of identifying which mobile services require updating to reflect changes to mobile services related objects (e.g., Network Elements of type SGW, PGW, or eNodeB etc.) that are associated with one or more Mobile Services. This querying and then updating of global structure possibly spanning many NEs forming a Mobile Service is expensive, requiring an enormous amount of input/output, memory and computational resources. As the number of deployed mobile services within a mobile network increases, the database resources are increasingly strained and an increasing number of out of sync mobile services is the result.

Presently, a service update process causes the mobile services table or database to be updated in response to a network update, change, error condition, status indication and the like. Essentially, any change in the network or services out of sync with the database is immediately used to update the entire mobile services table or database.

BRIEF SUMMARY

Various deficiencies of the prior art are addressed by the present invention of a method for updating a mobile services database by caching some or all of a mobile services related database or relevant portions thereof, identifying and optionally prioritize those data objects that need updating, and periodically update only those data objects. The update may be triggered by the expiration of a timer, the occurrence of a severe event or a threshold number of events, a customer command, a service provider command and so on.

One embodiment is a method for use in a mobile services management system including a database for storing mobile service objects representing network elements or portions thereof supporting each of a plurality of mobile services, the method includes: caching at least a portion of the mobile services database; updating the cache in response to receiving mobile service update objects; and in response to the occurrence of a trigger event, updating at least a portion of those mobile services within the database that are affected by the cached mobile service update objects.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a network management system (NMS) in which at least some database updates are cached and updated only in response to various trigger conditions.

Generally speaking, a database representation of a Mobile Service contains objects representing Mobile Service Connectors such as EPS Paths and Mobile Service Sites such as SGWs, PGWs, GGSNs, eNodeBs and the like. In turn, those objects have pointers to the "real" instance of the EPS Path or Mobile Gateway.

While primarily discussed within the context of managing a Long Term Evolution (LTE) network, those skilled in the art and informed by the teachings herein will realize that the invention is also applicable within the context of a NMS managing data objects associated with other types of wireless networks (e.g., 3G networks, 2G networks, WiMAX, etc.), wireline networks or combinations of wireless and wireline networks. Thus, the various connectors, sites and other objects representing mobile services may identify network elements associated with various wireless and wireline networks.

The embodiments operate to cache some (e.g., just the mobile services table) or all of a mobile services database, identify and optionally prioritize those data objects that need updating, and periodically update only those data objects. The update is triggered by the expiration of a timer, the occurrence of a severe event or a threshold number of events, a customer command, a service provider command and so on.

Figure 1:
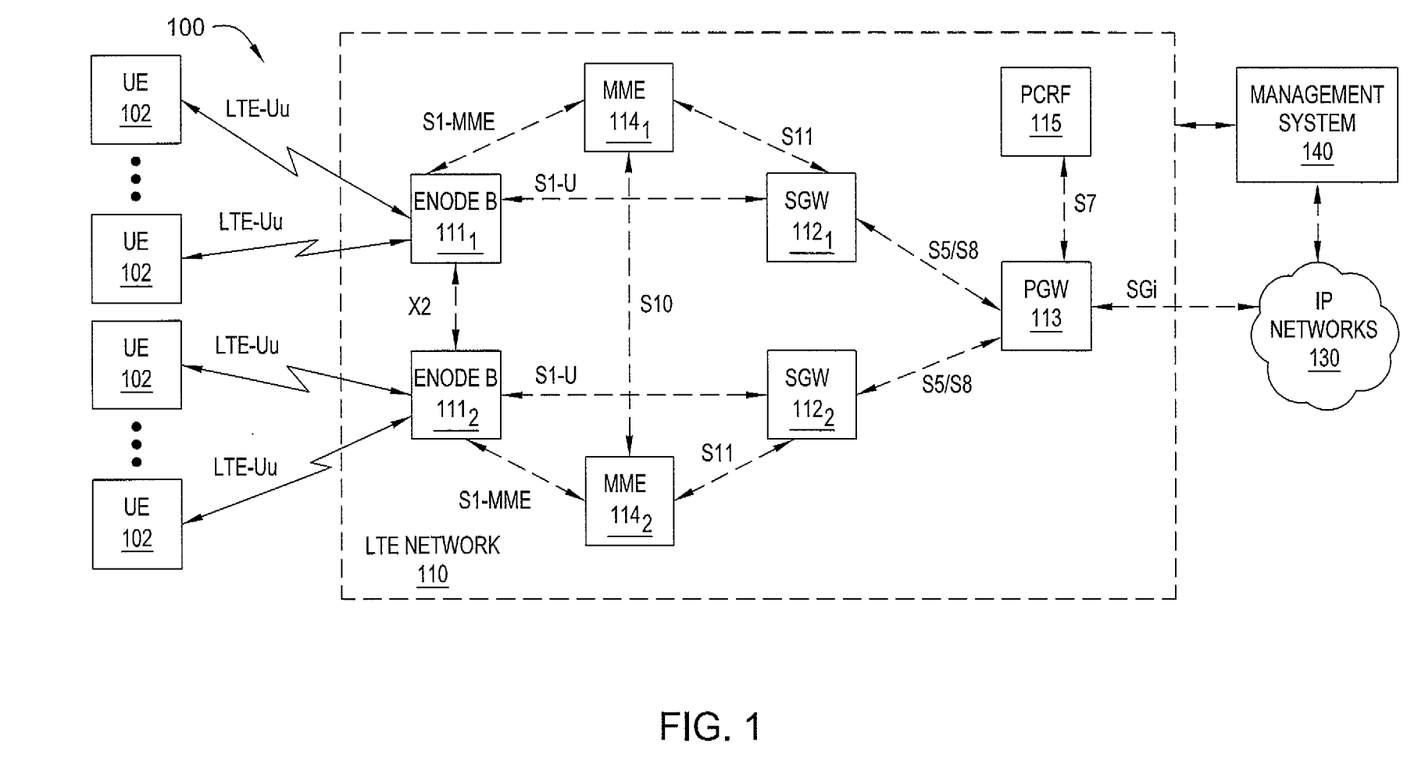
FIG. 1 depicts an exemplary wireless communication system including a management system according to an embodiment.

FIG. 1 depicts an exemplary wireless communication system including a management system according to an embodiment. Specifically, FIG. 1 depicts an exemplary wireless communication system 100 that includes a plurality of User Equipments (UEs) or User Devices (UDs) 102, a Long Term Evolution (LTE) network 110, IP networks 130, and a management system (MS) 140. The LTE network 110 supports communications between the UEs 102 and IP networks 130. The MS 140 is configured for supporting various management functions for LTE network 110 such as described with respect to the MS 200 of FIG. 2 and further as described herein.

The UEs 102 are wireless user devices capable of accessing a wireless network, such as LTE network 110. The UEs 102 are capable of supporting control signaling in support of the bearer session(s). The UEs 102 may be a phone, PDA, computer, or any other wireless user device.

The configuration and operation of LTE networks will be understood by one skilled in the art. The exemplary LTE network 110 includes two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, two Mobility Management Entities (MMEs) $114_1$ and $114_2$ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The SGWs 112 support communications for eNodeBs 111. As depicted in FIG. 1, SGW $112_1$ supports communications for eNodeB $111_1$ and SGW $112_2$ supports communications for eNodeB $111_2$. The communication between the SGWs 112 and the eNodeBs 111 is supported using respective S1-u interfaces. The S1-u interfaces support per-bearer user plane tunneling and inter-eNodeB path switching during handover.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via an SGi interface.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111.

The PCRF 115 provides dynamic management capabilities by which the service provider may manage rules related to services provided via LTE network 110 and rules related to charging for services provided via LTE network 110.

As depicted in FIG. 1, elements of LTE network 110 communicate via interfaces between the elements. The interfaces described with respect to LTE network 110 also may be referred to as sessions.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities. An exemplary management system suitable for use as MS 140 of FIG. 1 is depicted and described with respect to FIG. 2.

FIG. 1 further depicts a path associated with an exemplary Mobile Service 101. As depicted in FIG. 1, the exemplary Mobile Service 101 includes eNodeB $111_1$, SGW $112_1$, PGW 113, the S1-u interface between eNodeB $111_1$ and SGW $112_1$, the S5/S8 interface between SGW $112_1$ and PGW 113, the SGi interface between PGW 113 and IP networks 130, the S1-MME interface between eNodeB $111_1$ and MME $114_1$, the S1-u interface between SGW $112_1$ and MME $114_1$, and the S7 interface between PGW 113 and PCRF 115. The exemplary Mobile Service 101 is marked on FIG. 1 using a solid line representation.

Figure 2:
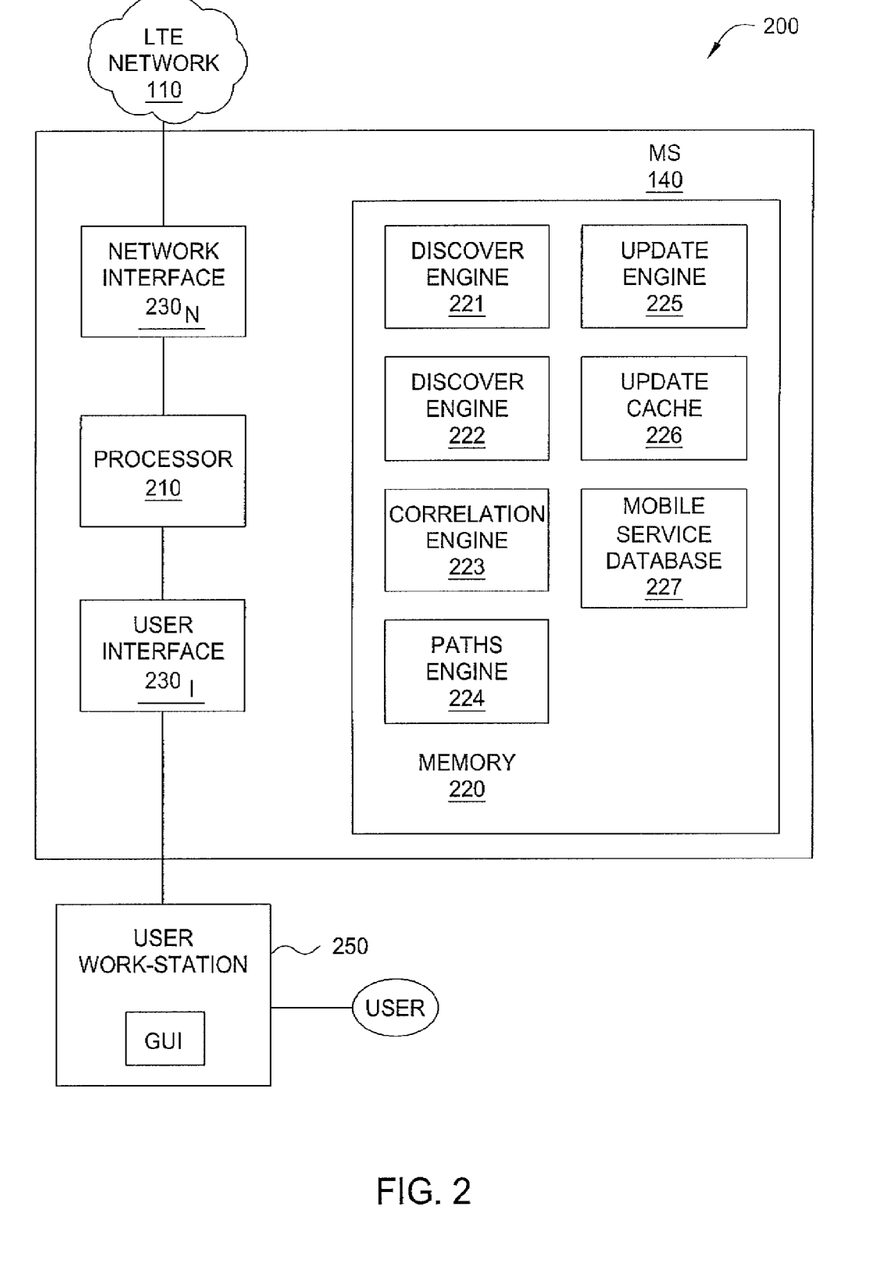
FIG. 2 depicts an exemplary management system suitable for use as the management system of FIG. 1.

FIG. 2 depicts an exemplary management system suitable for use as the management system of FIG. 1. As depicted in FIG. 2, MS 140 includes a processor 210, a memory 220, a network interface 230N, and a user interface 230I. The processor 210 is coupled to each of the memory 220, the network interface 230N, and the user interface 230I.

The processor 210 is adapted to cooperate with the memory 220, the network interface 230N, the user interface 230I, and the support circuits 240 to provide various management functions for LTE network 110.

The memory 220, generally speaking, stores programs, data, tools and the like that are adapted for use in providing various management functions for LTE network 110. The memory includes a Discovery Engine (DE) 221, a Discovery Database (DD) 222, a Correlation Engine (CE) 223, a Paths Database (PD) 224, an Update Engine (UE) 225, an Update Cache (UC) 226 and a Mobile Services Database (MSD) 227.

In one embodiment, the DE 221, CE 223 and UE 225 are implemented using software instructions which may be executed by processor (e.g., processor 210) for performing the various management functions depicted and described herein.

The DD 222, PD 224 and MSD 227 each store data which may be generated by and used by various ones and/or combinations of the engines and tools of memory 220. The DD 222, PD 224 and MSD 227 may be combined into a single database or implemented as respective databases, memory structures and/or portions thereof. Either of the combined or respective databases or caches may be implemented as single databases or multiple databases in any of the arrangements known to those skilled in the art.

Although depicted and described with respect to an embodiment in which each of the engines, databases and cache is stored within memory 120, it will be appreciated by those skilled in the art that the engines, databases and/or cache may be stored in one or more other storage devices internal to MS 140 and/or external to MS 140. The engines, databases and/or cache may be distributed across any suitable numbers and/or types of storage devices internal and/or external to MS 140. The memory 220, including each of the engines, databases and/or cache of memory 220, is described in additional detail herein below.

The network interface 230N is adapted to facilitate communications with LTE network 110. For example, network interface 230N is adapted to receive information from LTE network 110 (e.g., discovery information adapted for use in determining the topology of LTE network, results of test initiated by MS 140 to LTE network 110, and the like, as well as any other information which may be received by MS 140 from LTE network 110 in support of the management functions performed by MS 140). Similarly, for example, network interface 230N is adapted to transmit information to LTE network 110 (e.g., discovery requests for discovering information adapted for use by MS 140 in determining the topology of LTE network, audits request for auditing portions of LTE network 110, and the like, as well as any other information which may be transmitted by MS 140 to LTE network 110 in support of the management functions performed by MS 140).

The user interface 230I is adapted to facilitate communications with one or more user workstations (illustratively, user workstation 250), for enabling one or more users to perform management functions for LTE network 110. The communications include communications to user workstation 250 (e.g., for presenting imagery generated by MS 140) and communications from user workstation 250 (e.g., for receiving user interactions with information presented via user workstation 250). Although primarily depicted and described as a direct connection between MS 140 and user workstation 250, it will be appreciated that the connection between MS 140 and user workstation 250 may be provided using any suitable underlying communication capabilities, such that user workstation 250 may be located proximate to MS 140 (e.g., such as where both MS 140 and user workstation 250 are located within a Network Operations Center (NOC)) or remote from MS 140 (e.g., such as where communications between MS 140 and user workstation 250 may be transported over long distances).

Although primarily depicted and described herein with respect to one user workstation, it will be appreciated that MS 140 may communicate with any suitable number of user workstations, such that any number of users may perform management functions for LTE network 110 (e.g., such as where a team of technicians at a NOC access MS 140 via respective user workstations for performing various management functions for LTE network 110). Although primarily depicted and described with respect to user workstations, it will be appreciated that user interface 230I may be adapted to support communications with any other devices suitable for use in managing LTE network 110 via MS 140 (e.g., for displaying imagery generated by MS 140 on one or more common NOC display screens, for enabling remote Virtual Private Network (VPN) access to MS 140 by users via remote computers, and the like, as well as various combinations thereof). The use of user workstations to perform management functions via interaction with a management system will be understood by one skilled in the art.

As described herein, memory 220 includes the DE 221, DD 222, CE 223, PD 224, UE 225, UC 226 and MSD 227, which cooperate to provide the various functions and improvements thereto as depicted and described herein. Although primarily depicted and described herein with respect to specific functions being performed by and/or using specific ones of the engines, databases and/or cache of memory 220, it will be appreciated that any of the management functions depicted and described herein may be performed by and/or using any one or more of the engines, databases and/or cache of memory 220.

Discovery Engine

The discovery engine (DE) 221 is generally adapted for providing network discovery functions for discovering information about LTE network 110. Generally speaking, the DE 221 performs a discovery process in which configuration information, status/operating information and connection information regarding the elements and sub-elements forming the network is gathered, retrieved, inferred and/or generated as will be discussed in more detail below.

The discovery process may be dynamic in that the underlying elements, sub-elements and links within the LTE network may change over time due to local network adaptations, rerouting, failures, degradations, scheduled maintenance and the like. Thus, the DE 221 may be invoked after a network change is detected or caused.

At a first discovery level, the network management system (NMS) uses any legacy database information to discover the various elements (and the corresponding sub-elements) forming the network to be managed. That is, some of this discovery comprises the use of existing database information which provides a general blueprint of the network to be managed. Information in such a database includes information associated with the major functional elements forming a network, the major pipes or conduits established within the network and so on. While such information may be extremely detailed, the information does not reflect path-level network operation.

At a second discovery level, the network management system requests configuration information, status/operating information and connection information from each of the network elements within the managed network. The requested information includes information useful in determining the specific switches, ports, buffers, protocols and the like within the network elements that support the various traffic flows.

Configuration information comprises information identifying a network element, the function and/or configuration of the network element, the function and/or configuration of the sub-elements forming a network element and so on. Configuration information illustratively includes, but is not limited to, information identifying the type of network element, protocols supported by the network element, services supported by the network element and so on. Configuration information illustratively includes information attending to the various sub-elements within the network element, such as the input ports, switches, buffers, and output ports and so on associated with the sub-elements forming a network element.

Status/operating information comprises status/operating information associated with the operating state of the network element and/or the sub-elements forming a network element. Status/operating information illustratively includes, but is not limited to, information providing operating status/alarm indicators, including information pertaining to metrics such as packet count, utilization level, component pass/fail indication, bit error rate (BER) and the like.

Connection information comprises information useful in ascertaining or inferring the connections between network elements and/or sub-elements, such as the source of data received from the network element or its sub-elements, the destination of data transmitted by the network element or its sub-elements and so on. Connection information illustratively includes, but is not limited to, source address information associated with received packets, destination address information associated with transmitted packets, protocol information associated with packet flows, service information associated with packet flows, deep packet inspection results data and the like.

At a third discovery level, the network management system uses the discovered information to form a detailed framework representing each of the elements, sub-elements and links forming the infrastructure of the network, as well as their respective and various interconnections.

Generally speaking, the DE 221 may discover any suitable information associated with LTE network 110, which may be referred to collectively herein as discovery information, and further divided into configuration information, status/operating information and connection information.

In one embodiment, for example, DE 221 discovers components of the LTE network 110 and information associated with components of the LTE network 110. The components of LTE network 110 that are discovered by DE 221 may include any components, such as network elements (EPC network elements, non-EPC network elements, and the like), sub-elements of network elements (e.g., chassis, traffic cards, control cards, interfaces, ports, processors, memory, and the like), communication links connecting network elements, interfaces/sessions that support communications between network elements (e.g., LTE-Uu sessions, S* sessions, and the like), reference points, functions, services, and the like, as well as combinations thereof.

Correlation Engine

The CE 223 provides correlation of information used to support the management functions depicted and described herein. The CE 223 utilizes configuration information, status/operations information and/or connections information, illustratively provided by the DE 221 and stored within the DD 222, to correlate discovered network element, sub-element and link functions to specific customer traffic flows and/or paths supporting customer services. That is, using the framework representing each of the elements, sub-elements and links within the network and their various interconnections, the CE 223 correlates each customer service, traffic flow and/or EPS-path to the specific elements, sub-elements and links necessary to support the customer service, traffic flow and/or path.

The correlation process may be dynamic in that, for any given path, the underlying elements, sub-elements and links supporting that path may change over time due to local network adaptations, rerouting, failures, degradations, scheduled maintenance and the like.

The CE operates to maintain a current representation of the necessary supporting infrastructure associated with each customer service, traffic flow and/or path. By providing this representation, efforts responsive to customer service failure or degradation can be focused on the specific element, sub-element and link functions supporting the impacted customer service (e.g., by using TT 227). Similarly, efforts responsive to element, sub-element and link function failure or degradation can be focused on the specific customers and/or services supported by the impacted element, sub-element and link function.

Typically, only a small subset of the sub-elements within a particular element is necessary to support a particular path. Thus, a failure associated with other sub-elements within an element does not impact that particular path. By correlating to each path only those elements necessary to support the path, the processing/storage burdens associated with managing individual paths are reduced by avoiding processing/storage requirements associated with nonessential (from the perspective of a particular path) elements.

In one embodiment, CE 223 may process discovery information stored in DD 222 for purposes of determining the underlying transport elements supporting the paths of LTE network 110, which is then stored in PD 224. In one embodiment, the path correlated transport element information determined by CE 223 and stored in PD 224 include EPS-related paths of LTE network 110.

In general, an EPS-related path is a path that is a transport mechanism that represents a peering relationship between two EPS reference points, where an EPS reference point is a termination point for any node of LTE network 110 that implements one or more of the protocols present in the 4G specification (e.g., using GTP, PMIP, or any other suitable protocols, and the like, as well as combinations thereof).

The path correlated transport element information may comprise network elements, communications links, subnets, protocols, services, applications, layers and any portions thereof. These transport elements may be managed by the network management system or portions thereof. The network management system may simply be aware of these transport elements.

As depicted and described herein, EPS reference points may include: for an eNodeB (S1-u, S1-MME, X2, and the like); for an SGW 112 (S1-u, S5/S8, S11, Gxs, and the like); for a PGW (S5/S8, SGi, SGx, S7, S2a, S2b, S2c, and the like); for an MME (S1-MME, S11, S10, and the like); and for a PCRF (S7). Thus, EPS-related paths correspond generally to the various S* sessions between the eNodeBs and EPC nodes (e.g., a path between an eNodeB 111 and an SGW 112 in the case of S1-u reference points, a path between an SGW 112 and PGW 113 in the case of S5/S8 reference points, a path between an eNodeB 111 and an MME 114 in the case of S1-MME reference points, and the like).

In one embodiment, the path correlated transport element information determined by CE 223 and stored in PD 224 include other types of paths (e.g., paths other than EPS-related paths). For example, the other types of paths may includes one or more of: (1) paths that form sub-portions of EPS-related paths (e.g., where an EPS-related path is supported using underlying communications technology, the path that forms a sub-portion of the EPS-related path may be a path associated with the underlying communications technology, (2) paths that include multiple EPS-related paths (e.g., paths from eNodeBs to PGWs that traverse both S1-u and S5/S8 sessions, paths from UEs to SGWs that traverse both LTE-Uu sessions and S1-u sessions, and the like), and (3) end-to-end mobile session paths (e.g., paths between UEs and IP networks). The path correlated transport element information determined by CE 223 and stored in PD 224 may include other information correlated with various types of paths.

The path correlated transport element information determined by the CE 223 and stored in the PD 224 may be determined using any suitable processing.

Update Engine

The update engine (UE) 225 is generally adapted for providing network update functions associated with the addition, deletion or modification of any mobile service component within the LTE network 110.

After the network manager discovers the network elements and their connections as previously described, the network manager may identify the LTE type network elements, such as PGW, SGW, eNodeB, MME, PCRF, SGSN and the like. Of primary interest are the PGW, SGW and eNodeB. Between these network elements are EPS paths having associated reference points on the network elements, where the EPS paths/reference points are denoted as S1-u, S5, SGi and so on. Thus, stored in a database is a collection of modular components, of type "network element" for the PGW, SGW, eNodeB and the like, or type "connector" for the EPS paths.

Generally speaking, one gateway instance is provided at a Network Element such as a single PGW or SGW mapped to one Network Element; and such mapping is reflected in the database representation of the Mobile Services supported by the Network Element, PGW, SGW and the like. However, in various embodiments multiple Gateway Instances may be provided at a single Network Element. Thus, the terms "network element," "site," "mobile gateway site" and "mobile service site" are intended to be broadly construed to reflect the use of single or multiple gateway instances.

The network manager may define a plurality of Mobile Services by connecting or concatenating instances of the two types of modular components (i.e., network elements and connectors), such as the sequence of network elements and connectors between a customer served via a specific eNodeB and a data stream or other service received from the IP core network at the PGW. Thus, in one embodiment, a mobile service comprises a structure or wrapper containing a concatenated sequence of network elements and connectors.

A Mobile Service may be defined in terms of a particular customer, a particular eNodeB, a particular APN, a particular service provider, a particular content source, a particular customer and so on. A mobile service may include one or more instances of an EPS on a network element, such as one or more of an SGW or a PGW on a single or common network element. A mobile service may be supported by multiple network topologies.

As previously noted, the DD 222, PD 224 and MSD 227 may be combined into a single database or implemented as respective databases, memory structures and/or portions thereof. Either of the combined or respective databases or caches may be implemented as single databases or multiple databases in any of the arrangements known to those skilled in the art.

For purposes of simplifying the discussion, it will be assumed that the MSD 227 is used to store a mobile services table in which each mobile service and the underlying paths and/or transport layer elements supporting the mobile service are defined. Any additions, deletions or modification to a mobile service, an underlying path supporting the mobile service, or an underlying transport layer element supporting a path or mobile service will result in corresponding additions, deletions or modification within the mobile services database 227 via a service update process such that the database entries in the mobile services database 227 are kept synchronized with the actual mobile services they represent.

Specifically, a mobile service is considered to be synchronized when the information stored within a network management database, such as a mobile services table within a database such as the MSD 227, matches the actual configuration information, status/operating information and connection information pertaining to the service elements or components supporting the mobile service.

When there is a change to the mobile service or one of its underlying components or elements, the database is out of sync. In this case, the mobile service and its underlying elements cannot be managed with the same degree of precision as when they are synchronized since the database information is or may be incorrect.

Therefore, whenever there is a change in a mobile service, or a transport layer element/sub-element supporting the mobile service, the database needs to be updated to reflect the change and remain synchronized.

Figure 3:
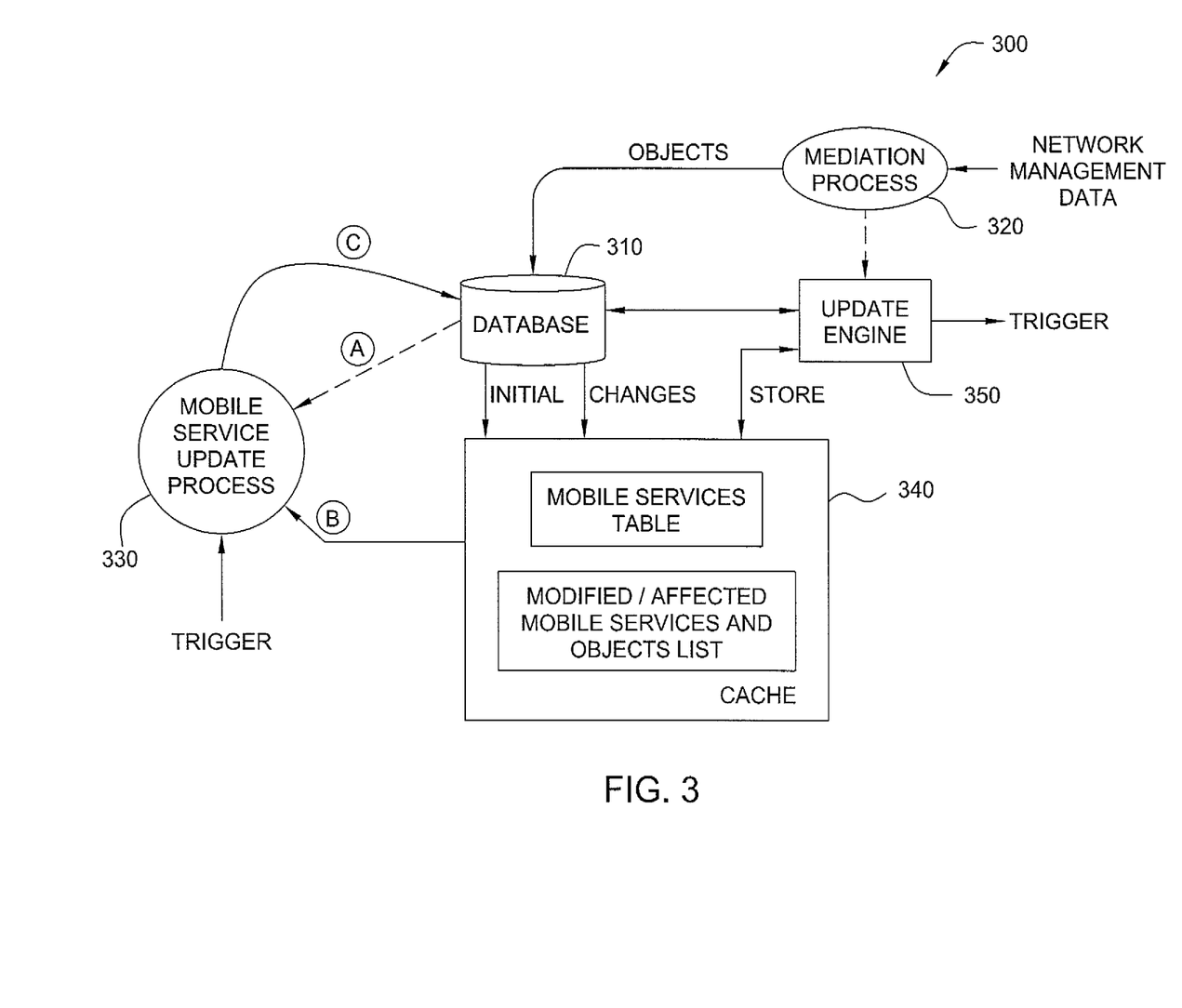
FIG. 3 depicts a graphical representation of processes associated with various embodiments.

FIG. 3 depicts a graphical representation of processes associated with various embodiments. Specifically, FIG. 3 depicts a graphical representation 300 of a database 310 receiving objects to be processed from a mediation process 320. The mediation process 320 utilizes network management data to define or identify elements and/or sub-elements that have changed within the transport layer infrastructure and/or correlated path or mobile service layers.

These objects are normally processed by a mobile service update process 330 associated with the database 310 to generate thereby database updates (paths A and C).

According to the various embodiments, a cache 340 stores mobile services table information as well as a modified/affected mobile services objects list in response to an update engine 350. Similarly, the mobile service update process 330 periodically processes some or all of the cached information in response to a trigger signal provided by the update engine 350 (paths B and C). The specific information to be cached and the trigger criteria will be discussed in more detail below with respect to FIG. 4.

Figure 4:
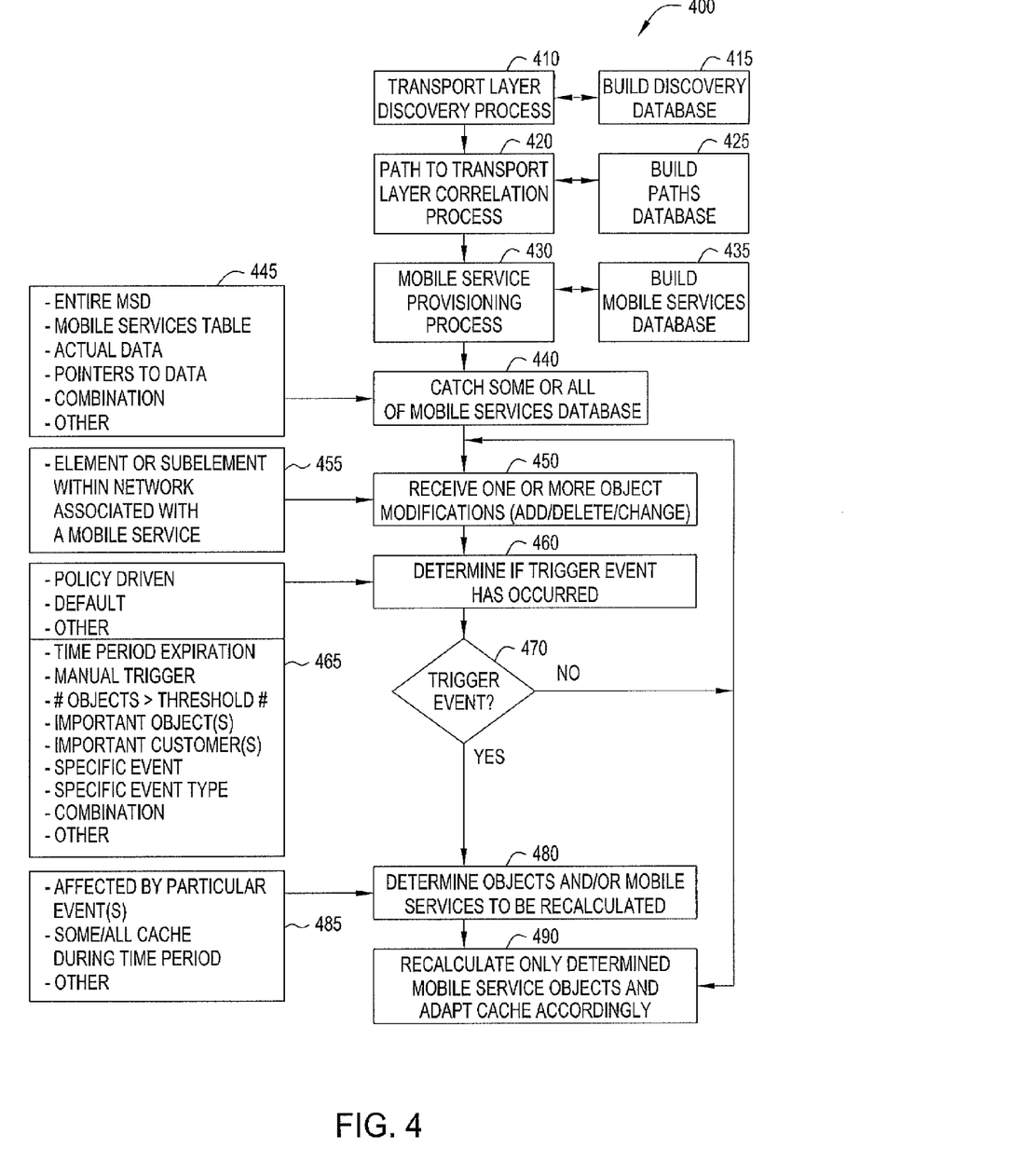
FIG. 4 depicts a flow diagram of a method according to one embodiment.

FIG. 4 depicts a flow diagram of a method according to one embodiment. Specifically, FIG. 4 depicts a method 400 for caching objects normally requiring an immediate update of the mobile services database, determining which mobile services are affected by which cached object, and updating some or all of the affected mobile services in response to a trigger condition, such as a policy-defined trigger condition.

At step 410, a transport layer discovery process is performed, such as described above with respect to the discovery engine 221. Referring to box 415, the discovery process operates to build or augment an existing database, such as described above with respect to the discovery database 222.

At step 420, a path to transport layer correlation process is performed, such as described above with respect to the correlation engine 223. Referring to box 425, the correlation process operates to build or augment an existing database, such as described above with respect to the paths database 224.

At step 430, a mobile services provisioning process is performed, such as described above with respect to the various figures. Generally speaking, mobile services are provisioned in response to service provider needs, service user needs, session requests and the like. Referring to box 435, the mobile services provisioning process operates to build or augment an existing database, such as described above with respect to the mobile services database 227.

As previously noted, the various databases discussed herein may comprise individual databases or combined databases. The operation of steps 410-435 leads to one or more databases that are substantially accurate in terms of discovered transport layer infrastructure, the correlation of transport layer infrastructure to paths, and the correlation of paths and/or transport layer infrastructure to the various mobile services delivered thereby. This accuracy changes quickly as equipment, capability, protocols, services and the like are added to, deleted from, or otherwise modified.

The mobile services database 227 contains current information related to the various components associated with each mobile services. Various embodiments may cache a list of all objects that have been modified within a predefined time period. Each object represents a particular element or sub-element within the mobile services network, such as a router identification, a router port identification, a protocol, a subnet, a network node or link and so on.

For example, any of a number of events will impact or modify a subset of the element or sub-elements forming the mobile services network. Exemplary events include adding a new service gateway to the network, removing an eNodeB, a link failure, a network element becoming unstable and so on.

At step 440, some or all of the mobile services database is cached. That is, referring to box 445, the entire mobile services database may be cached, a mobile services table may be cached, the actual data associated with the database or table may be cached, pointers to the data associated with the database or table may be cached, some combination of the above may be cached and/or other data elements representing one or more portions of mobile services database or pointers thereto may be cached.

At step 450, one or more object modifications are received. That is, referring to box 455, an object modification comprises any additions, deletions or modification to an element or sub element within the network that is associated with a mobile service. The element or sub element may comprise an element or sub element within the transport layer infrastructure, and element or sub element defining a path and/or an element or sub element defining the mobile service. Each object modification is associated with one or more elements and/or sub-elements supporting one or more mobile services. The database representation of the elements and/or sub-elements must be modified so that the supportive mobile services are synchronized in terms of database representation.

At step 460, a determination is made as to whether a trigger event has occurred. Referring to box 465, a trigger event may be a policy driven event, default event or other event. In particular, a trigger event may comprise any or all of the expiration of a predefined time period, a manual trigger event such as a customer "synchronize database now" command, a determination that a number of objects to be synchronized exceeds a threshold number, a determination that one or more important or preferred object modifications have been received, a determination that object modifications associated with one or more important or preferred customers or objects has been received, a determination that a specific event has occurred, a determination that a specific event type has occurred, and/or other event criteria either singly or in any combination.

In various embodiments, an important or preferred object such as associated with a triggering event may comprise an object associated with a specific type of network element, such as a PGW, SGW, eNodeB and the like; an object indicative of a specific type of network condition, such as a failure, warning, congestion or other condition; an object associated with a specific type of traffic such as voice, streaming media, and the like; an object associated with a specific type of customer, such as a preferred or hierarchically important or preferred customer; an object associated with a specific service provider, such as a preferred or hierarchically important or preferred service provider; an object associated with a specific type of content or service source, such as a hierarchically important or preferred content source and so on. Any criteria, including the identification and/or hierarchical level associated with an important or preferred object, service provider, customer, content type and so on may be defined or updated via a control or management update, policy function and the like.

At step 470, if it has been determined that a trigger event has not occurred, then the method 400 proceeds to step 450 where the method waits for one or more object modifications to the received. However, if it has been determined that a trigger event has occurred, then the method 400 proceeds to step 480.

At step 480, a determination is made as to the objects and/or mobile services to be recalculated. Specifically, referring to box 485, the object and/or mobile services to be recalculated may comprise all or a subset of the mobile services associated with received objects requiring modification, such as only those mobile services affected by a particular event or type of event, only those mobile services that have not been recalculated within a predefined time period, only those mobile services associated with important or preferred customers, only those mobile services associated with a service level agreement (SLA) that require recalculation at this time and so on. The determination criteria associated with the objects and/or mobile services to be recalculated may be a policy driven event, default event or other event.

In various embodiments, an important or preferred object or mobile service for preferential recalculation may comprise an object or mobile service associated with a specific type of network element, such as a PGW, SGW, eNodeB and the like; an object or mobile service indicative of a specific type of network condition, such as a failure, warning, congestion or other condition; an object or mobile service associated with a specific type of traffic such as voice, streaming media, and the like; an object or mobile service associated with a specific type of customer, such as a preferred or hierarchically important or preferred customer; an object or mobile service associated with a specific service provider, such as a preferred or hierarchically important or preferred service provider; an object or mobile service associated with a specific content or service source, such as a hierarchically important or preferred content source and so on.

In various embodiments, important or preferred objects or mobile services are considered within the context of a hierarchy of objects or mobile services, where those objects or mobile services toward the top of the hierarchy are updated more frequently than those toward the bottom.

In various embodiments, each hierarchical layer associated with an important or preferred object or mobile service is also associated with a predefined time period within which the an important or preferred objects or mobile services within that layer must be recalculated. In effect, the expiration of the predefined time period for recalculation for an object or mobile service within a lower layer will operate to push that mobile service or object into a high layer. The effective increase in priority associated with an object or mobile service may be total (expired time period means object recalculated immediately) or partial (expired time period means object recalculated as if part of a higher layer).

At step 490, the method recalculates or synchronizes those mobile services determined to require recalculation of synchronization at this time. In various embodiments, all mobile services requiring resynchronization are processed within a predefined period of time. That is, the mobile services database 227 is updated to reflect mobile services table additions, deletions and/or modifications associated with some or all of the updated mobile services objects within the cached mobile services table.

In various embodiments, the predefined period of time within which mobile services requiring resynchronization are processed varies based upon the importance of a customer or subscriber, the service level agreements associated with the subscriber and/or other criteria. In various embodiments, the mobile services are process during off-peak time periods where such processing delays due not violate service level agreements or customer expectations.

After processing some or all of the cached mobile service objects, the method 400 proceeds to step 450 where the method waits for one or more object modifications to be received.

In operation, mobile services requiring preferential synchronization with the mobile services database are process in a preferential manner. One benefit realized by the operation of the various embodiments is a reduction in processing associated with mobile services where multiple changes have occurred, since all of the multiple changes (if cached) will be processed at the same time. Other benefits include having all the changes for a particular Mobile Service processed at one time such that conflicting or suboptimal changes associated with a mobile service may be processed by the NMS at the same time, thereby avoiding a jitter condition where, for example, some Paths are changed repeatedly due to an underlying intermittent outage. By recording multiple changes and processing them at one time, filtering algorithms may be employed to remove those changes that conflict with other changes, are suboptimal from a management perspective, or otherwise should not be made given the information available to the NMS at the time of processing the cached changes.

Various embodiments operate to cache some (e.g., just the mobile services table) or all of the database, identify those data objects that need updating and periodically update only those data objects. The invention provides a cache for automatically updating mobile services data based on network events.

Generally speaking, the specific mobile services that need to be updated based upon a specific network event are processed with an urgency corresponding to that of the specific network event (e.g., a new path provisioned/restored, a new network element or link added to the system and so on).

Advantageously, the various embodiments provide a policy driven recalculation function wherein recalculation is performed when policy-defined trigger criteria are met. This may be triggered by the expiration of a timer, the occurrence of a specific type of event, the occurrence of a type of event deemed to be unusually serious (e.g., add an S-Gateway, detect a failed link), the occurrence of a number of events above a threshold number of events, by the occurrence of a specific type of network change (e.g., addition of a major component), upon request by a customer or service provider and so on.

Advantageously, only those mobile service objects affected by a particular event are recalculated; namely, those mobile services objects that are stored in the second cache and represent the mobile services elements and sub-elements modified by the occurrence of an event within the predefined time period.

Generally speaking, in various embodiments discussed herein, any criteria associated with defining data to be cached, trigger events associated with cache to database synchronization, criteria associated with associated with trigger events, hierarchical arrangements and so on, criteria associated with partial cache to database synchronization and so on may be defined or updated via a control or management update function, such as a policy function and the like.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for use in a mobile services management system including a mobile services database for storing mobile service objects representing network elements or portions thereof supporting each of a plurality of mobile services, the method comprising:
    caching a portion of the mobile services database;
    updating said cache in response to receiving mobile service updates associated with any of cached mobile service objects and mobile services, wherein the mobile service objects are defined according to a hierarchy of mobile service objects having at least two hierarchical layers, wherein each hierarchical layer is associated with a respective predefined time period within which corresponding mobile services are to be recalculated;
    determining whether a trigger event for at least synchronizing said mobile services database has occurred;
    identifying, if the trigger event has occurred and based on a predefined criteria, a group comprising one or more of mobile service objects and mobile services affected by said mobile service updates and needing a corresponding modification based on said mobile service updates; and
    updating only said identified group comprising one or more of mobile service objects and mobile services using said corresponding modification to synchronize the cached portion of the mobile services database.

2. The method of claim 1, wherein the mobile service objects indicate an addition, deletion or modification of an element or sub-element within transport layer infrastructure of the network associated with one or more mobile services.

3. The method of claim 2, wherein the mobile service objects indicate an addition, deletion or modification of an element or sub-element within a path of the network that supports one or more mobile services.

4. The method of claim 3, wherein the path of the network that supports the one or more mobile services is correlated to transport layer infrastructure elements or sub-elements.

5. The method of claim 1, wherein the triggering event comprises an expiration of a predefined time period.

6. The method of claim 1, wherein the triggering event comprises one or more of a manual trigger signal, a determination that a number of objects to be synchronized exceeds a threshold number, and a determination that one or more objects has been received.

7. The method of claim 1, wherein the triggering event is defined by a policy.

8. The method of claim 1, wherein at least a portion of mobile services within the identified group is defined by a policy.

9. The method of claim 1, wherein at least a portion of mobile services within the identified group have not been recalculated within a predefined time period.

10. The method of claim 1, wherein at least a portion of mobile services within the identified group are associated with a specific type of network condition.

11. The method of claim 1, wherein at least a portion of mobile services within the identified group are associated with a specific type of customer or service provider.

12. The method of claim 1, wherein at least a portion of mobile services within the identified group are associated with a specific customer or service provider.

13. The method of claim 1, wherein at least a portion of mobile services within the identified group are associated with a specific type of content or service.

14. The method of claim 9, wherein the triggering event comprises one or more of a manual trigger signal, a determination that a number of objects to be synchronized exceeds a threshold number, and a determination that one or more objects has been received.

15. An apparatus for use in a mobile services management system including a database for storing mobile service objects representing network elements or portions thereof supporting each of a plurality of mobile services, the apparatus comprising:
    a processor configured for:
        caching a portion of the mobile services database;
        updating said cache in response to receiving mobile service updates associated with any of cached mobile service objects and mobile services, wherein the mobile service objects are defined according to a hierarchy of mobile service objects having at least two hierarchical layers, wherein each hierarchical layer is associated with a respective predefined time period within which corresponding mobile services are to be recalculated;
        determining whether a trigger event for at least synchronizing said mobile services database has occurred;
        identifying, if the trigger event has occurred and based on a predefined criteria, a group comprising one or more of mobile service objects and mobile services affected by said mobile service updates and needing a corresponding modification based on said mobile service updates; and updating only said identified group comprising one or more of mobile service objects and mobile services using said corresponding modification to synchronize the cached portion of the mobile services database.

16. A non-transitory computer readable medium including software instructions which, when executed by a processor, perform a method for use in a mobile services management system including a database for storing mobile service objects representing network elements or portions thereof supporting each of a plurality of mobile services, the method comprising:

caching a portion of the mobile services database;

updating said cache in response to receiving mobile service updates associated with any of cached mobile service objects and mobile services, wherein the mobile service objects are defined according to a hierarchy of mobile service objects having at least two hierarchical layers, wherein each hierarchical layer is associated with a respective predefined time period within which corresponding mobile services are to be recalculated;

determining whether a trigger event for at least synchronizing said mobile services database has occurred;

identifying, if the trigger event has occurred and based on a predefined criteria, a group comprising one or more of mobile service objects and mobile services affected by said mobile service updates and needing a corresponding modification based on said mobile service updates; and updating only said identified group comprising one or more of mobile service objects and mobile services using said corresponding modification to synchronize the cached portion of the mobile services database.

17. A non-transitory computer program product wherein computer instructions executed by a processor in a telecom network element adapt the operation of the telecom network element to provide a method for use in a mobile services management system including a database for storing mobile service objects representing network elements or portions thereof supporting each of a plurality of mobile services, the method comprising:

caching a portion of the mobile services database;

updating said cache in response to receiving mobile service updates associated with any of cached mobile service objects and mobile services, wherein the mobile service objects are defined according to a hierarchy of mobile service objects having at least two hierarchical layers, wherein each hierarchical layer is associated with a respective predefined time period within which corresponding mobile services are to be recalculated;

determining whether a trigger event for at least synchronizing said mobile services database has occurred;

identifying, if the trigger event has occurred and based on a predefined criteria, a group comprising one or more of mobile service objects and mobile services affected by said mobile service updates and needing a corresponding modification based on said mobile service updates; and updating only said identified group comprising one or more of mobile service objects and mobile services using said corresponding modification to synchronize the cached portion of the mobile services database.

18. The method of claim 6, wherein an object of the one or more objects is associated with one or more of a specific type of network element, a specific type of network condition, a specific type of traffic, a specific type of customer, a specific service provider, and a specific type of content or service source.

19. The method of claim 14, wherein an object of the one or more objects is associated with one or more of a specific type of network element, a specific type of network condition, a specific type of traffic, a specific type of customer, a specific service provider, and a specific type of content or service source.

* * * * *